United States Patent
Ueno et al.

(10) Patent No.: US 6,721,364 B1
(45) Date of Patent: Apr. 13, 2004

(54) DATA TRANSMISSION APPARATUS AND METHOD OF INITIALIZING REMAINING AMOUNT OF AVAILABLE BANDWIDTH IN DATA TRANSMISSION APPARATUS

(75) Inventors: Masatoshi Ueno, Tokyo (JP); Kazunobu Toguchi, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/435,790

(22) Filed: Nov. 8, 1999

(30) Foreign Application Priority Data

Nov. 9, 1998 (JP) .......................... P10-317729

(51) Int. Cl.⁷ ............................................. H04L 27/00
(52) U.S. Cl. .................. 375/259; 375/240.26; 375/287; 375/257
(58) Field of Search .............. 375/240.02, 240.01, 375/240, 240.26, 286, 287, 259, 257

(56) References Cited

U.S. PATENT DOCUMENTS 5,949,791 A * 9/1999 Byers et al. ................ 370/466
6,400,819 B1 * 6/2002 Nakano et al. ............. 379/229
6,408,355 B1 * 6/2002 Toguchi ..................... 710/314

* cited by examiner

*Primary Examiner*—Chi H. Pham
*Assistant Examiner*—Pankaj Kumar
(74) *Attorney, Agent, or Firm*—Jay H. Maioli

(57) ABSTRACT

Communication equipment having an available bandwidth less than 100 Mbps may be regarded as IEEE1394 communication equipment in which buses (21, 31) are connected together via a bridge (40). The bridge (40) includes portals (40A, 40B), and the portals (40A, 40B) communicate with each other through infrared rays. RAMs (43A, 43B) include bandwidth available registers for writing a remaining amount of an available bandwidth, which may be used in an isochronous communication within the bridge (40). ROMs (44A, 44B) store an available bandwidth, which may be used in a isochronous communication in respective infrared communication units (45A, 45B), as an initial value (BWR). When the bridge (40) is initialized, the initial value (BWR) is written in the bandwidth available registers. Thus, even when an available bandwidth between the infrared communication units (45A, 45B) is less than 100 Mbps, the bridge (40) may be regarded and operated as communication equipment in which the available bandwidth is 100 Mbps.

3 Claims, 10 Drawing Sheets

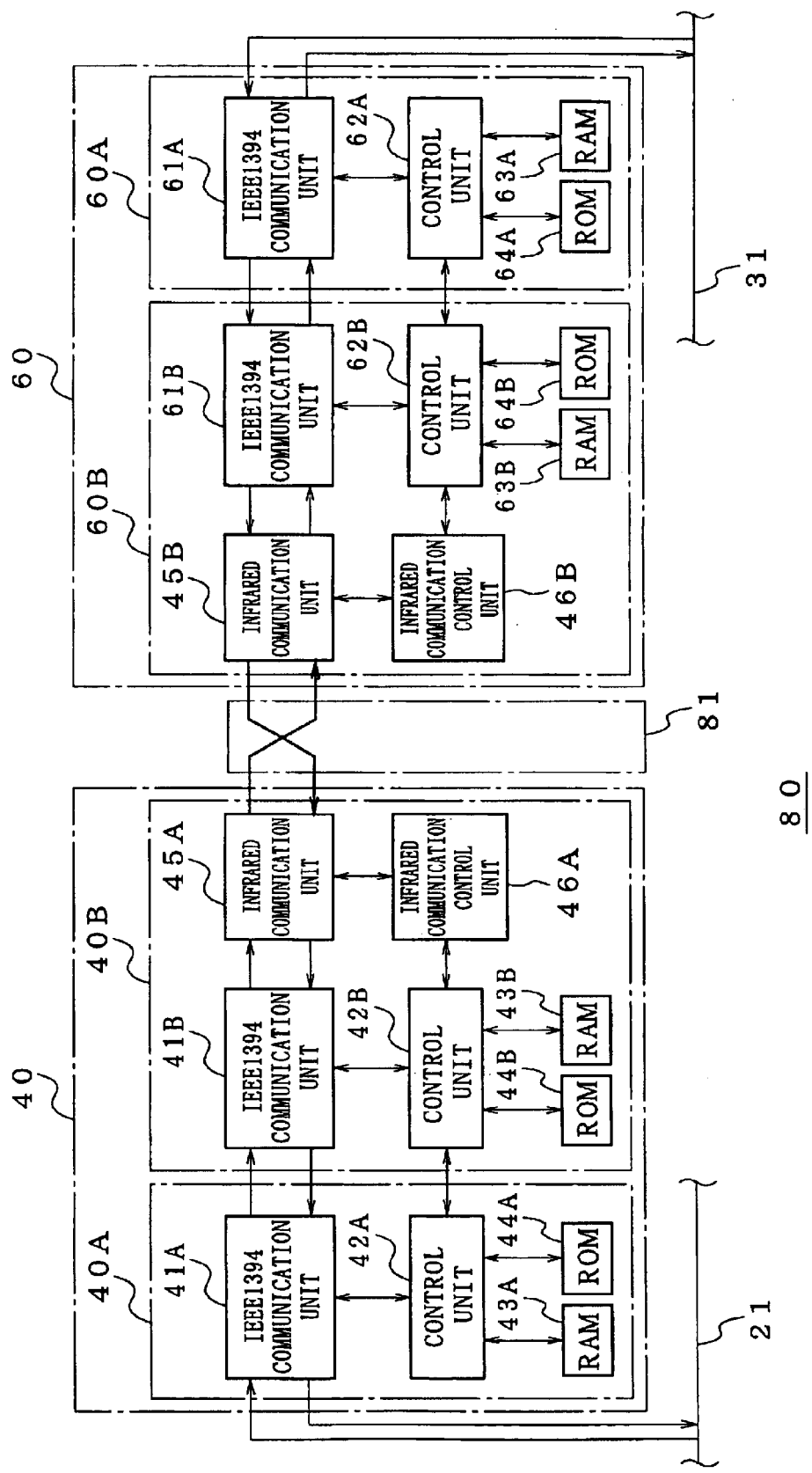

DATA TRANSMISSION APPARATUS AND METHOD OF INITIALIZING REMAINING AMOUNT OF AVAILABLE BANDWIDTH IN DATA TRANSMISSION APPARATUS

BACKGROUND OF THE INVENTION

1. Field of the Invention

The present invention generally relates to a data transmission apparatus and a method of initializing a remaining amount of an available bandwidth in such data transmission apparatus. More particularly, this invention relates to a data transmission apparatus comprising a first transmission unit having a first available bandwidth and a second transmission unit connected to the first transmission unit and which has a second available bandwidth smaller than the first available bandwidth and wherein an apparent available bandwidth of the whole transmission unit may be increased by setting the remaining amount of the first available bandwidth to a value equal to or smaller than the second available bandwidth.

2. Description of the Related Art

Heretofore, IEEE1394 has received a remarkable attention as a data transmission system suitable for multimedia use such as to connect home electronic equipment such as digital video recorders and to connect these electronic equipment and a computer together.

This IEEE1394 has two kinds of data transfer functions of asynchronous transfer function and isochronous transfer function. According to the asynchronous transfer function, asynchronous communication of data is effected in the memory mapped I/O system. On the other hand, according to the isochronous transfer function, data communication is effected by using channel numbers previously set on the transmission side and the reception side, and the isochronous communication of data is effected at the unit of 125 $\mu$s.

The IEEE1394 is the high-speed data transmission system and is also the standard corresponding to data transfer of 100 Mbps, 200 Mbps and 400 Mbps with respect to cable medium. Therefore, all equipment based on the IEEE1394 cable environment have to assure data transfer rate higher than 100 Mbps.

When communication environments of communication equipment using infrared communication, radio communication or public communication network such as telephone line are considered, there exists an environment under which it is difficult to realize a data transfer rate higher than 100 Mbps. Heretofore, due to the above-mentioned limit of the available bandwidth, communication equipment whose available bandwidth is less than 100 Mbps could not be regarded as the IEEE1394 equipment.

Moreover, since the data transfer rate supported by the IEEE1394 is discrete like 100 Mbps, 200 Mbps, 400 Mbps, in the case of communication equipment whose data transfer rate, for example, is 140 Mbps, such communication equipment is treated as communication equipment whose available bandwidth is 100 Mbps although it has the available bandwidth higher than 100 Mbps. As a result, the available bandwidth of 40 Mbps becomes useless. Similarly, in the case of communication equipment having a data transfer rate of 300 Mbps, for example, such communication equipment is treated as communication equipment having an available bandwidth of 200 Mbps with the result that an available bandwidth of 100 Mbps becomes useless.

SUMMARY OF THE INVENTION

Therefore, it is an object of the present invention to provide a data transmission apparatus in which communication equipment whose available bandwidth, for example, is less than 100 Mbps may be regarded as IEEE1394 communication equipment and in which a useless bandwidth of communication equipment may be removed.

It is another object of the present invention to provide a method of initializing a remaining amount of an available bandwidth in a data transmission apparatus.

According to an aspect of the present invention, there is provided a data transmission apparatus which is comprised of a first transmission unit having a first available bandwidth and a second transmission unit connected to the first transmission unit and which has a second available bandwidth smaller than the first available bandwidth, wherein the first transmission unit includes a remaining amount setting means for setting a remaining amount of an available bandwidth and the remaining amount setting means sets the remaining amount of the available bandwidth to a value equal to or smaller than the second available bandwidth when the first transmission unit is initialized.

According to another aspect of the present invention, there is provided a method of initializing a remaining amount of an available bandwidth in a data transmission apparatus including a first transmission unit having a first available bandwidth and a second transmission unit connected to the first transmission unit and which has a second available bandwidth smaller than the first available bandwidth. This method of initializing a remaining amount of an available bandwidth includes a step of writing a value equal to or smaller than the second bandwidth in a memory unit which sets a remaining amount of an available bandwidth of the first transmission unit when the first transmission unit is initialized.

In the present invention, the first transmission unit has the first bandwidth. The second transmission unit is connected to the first transmission unit and has the second bandwidth smaller than the first bandwidth. For example, the first bandwidth is a bandwidth which may be used in a synchronous communication at the first transmission unit. The second bandwidth is a bandwidth which may be used in the isochronous communication at the second transmission unit. The first transmission unit is a portal comprising a bridge which connects two buses (e.g. IEEE1394 buses), and the second transmission unit is a radio transmission line interposed between two portals comprising the bridge. The first transmission unit is a bus (e.g. IEEE1394 bus), and the second transmission unit is a radio transmission line interposed between two portals comprising a bridge connected to the bus.

In the first transmission unit, the remaining amount of the available bandwidth is set to a value equal to or smaller than the second bandwidth when the first transmission unit is initialized. For example, the first transmission unit includes the memory unit for setting the remaining amount of the available bandwidth. When the first transmission unit is initialized, the value equal to or smaller than the second bandwidth is written in the memory unit.

As described above, when the first transmission unit is initialized, since the remaining amount of the available bandwidth is set to the value equal to or smaller than the second bandwidth, it becomes possible to increase the whole bandwidth apparently. Thus, communication equipment having a data transfer rate of 40 Mbps, for example, maybe apparently operated as IEEE1394 communication equipment having a bandwidth of 100 Mbps. Moreover, communication equipment having a data transfer rate of 140 Mbps, for example, can be apparently operated as IEEE1394 communication equipment having a bandwidth of 200 Mbps. As a result, it becomes possible to remove a useless bandwidth of 40 Mbps.

BRIEF DESCRIPTION OF THE DRAWINGS

FIG. 12 is a block diagram showing a transmission system according to a third embodiment of the present invention.

DESCRIPTION OF THE PREFERRED EMBODIMENTS

Figure 1:
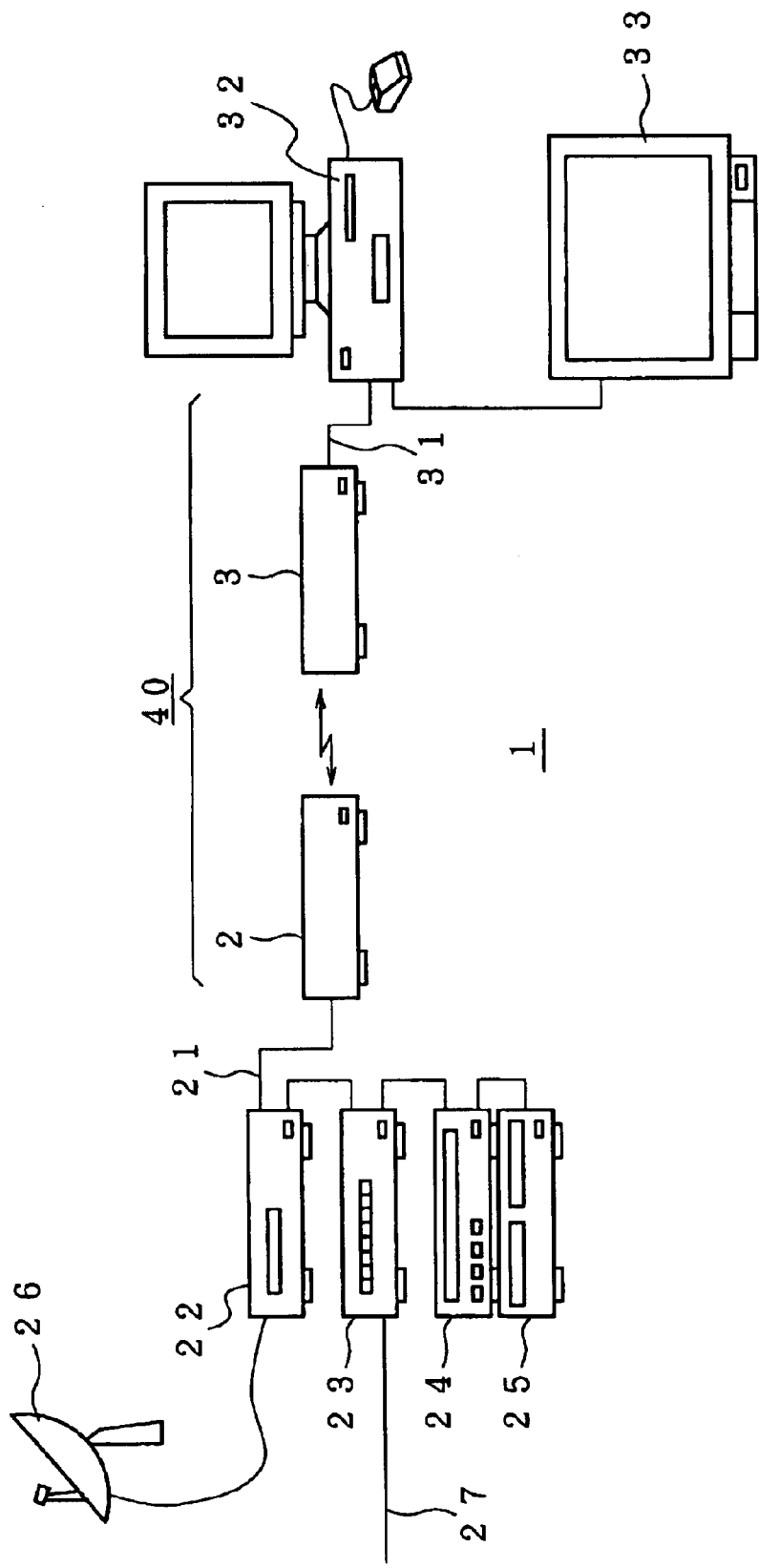
FIG. 1 is a block diagram showing a radio transmission system according to an embodiment of the present invention.

A first embodiment of the present invention will be described below with reference to the drawings. FIG. 1 of the accompanying drawings shows, in block form, an example of a radio transmission system 1 using infrared rays as a radio communication medium. As shown in FIG. 1, this radio transmission system 1 includes two radio transmission nodes (hereinafter referred to as "WN nodes") 2, 3.

The WN node 2 is connected to an IEEE1394 bus 21. To this IEEE1395 bus 21 are further connected a satellite broadcasting receiver 22, a CATV (cable television) receiving device (set-top box) 23, a digital video disc (DVD) device 24 and a video cassette recorder (VCR) 25 as IEEE1394 nodes. The satellite broadcasting receiver 22 has connected thereto an antenna 26 for receiving a satellite broadcasting signal. To the CATV receiving device 23 is connected a cable 27 through which a CATV signal is transmitted.

The WN node 3 is connected to an IEEE1394 bus 31. Then, to this bus 31 are further connected a computer 32 and a monitor 33 as IEEE1394 nodes.

In the radio transmission system 1 shown in FIG. 1, when data is transferred from the first node connected to the WN node 2 to the second node connected to the WN node 3, such data is converted into an infrared signal and then transferred.

Figure 3:
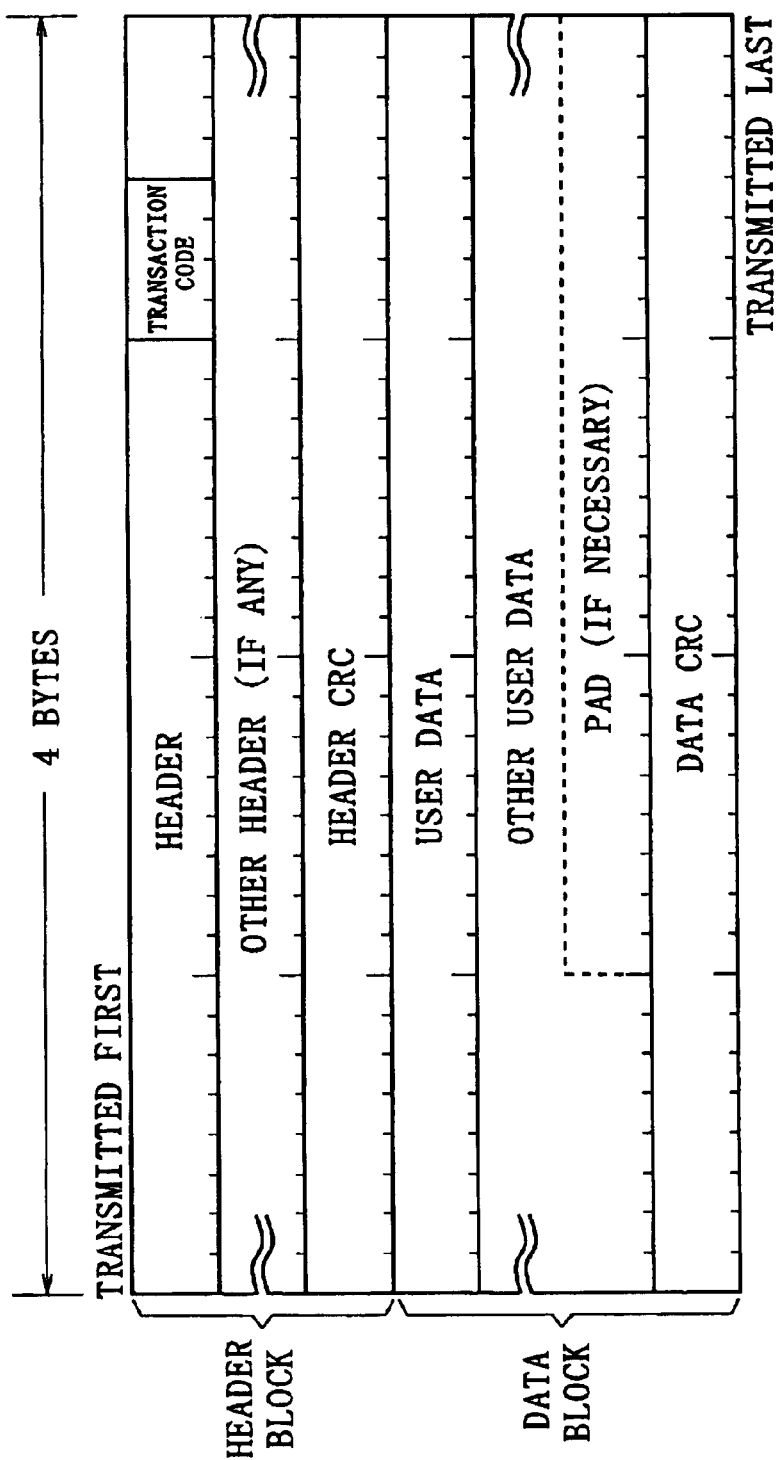
FIG. 3 is a diagram showing a basic format of IEEE1394 standard packet.

According to the IEEE1394 standard, data is transferred at the unit of packets. FIG. 3 shows a data format used when a data communication according to the IEEE1394 standard is effected, i.e. a basic format of packet. Roughly classified, this packet comprises a header, a transaction code (tcode), a header CRC, user data and data CRC as shown in FIG. 3. The header CRC is generated based on only the header. According to the IEEE1394 standard, it is regulated that the node should not effect the action on the header which is regarded as unsatisfactory by the check of the CRC header and also should not respond to such unsatisfactory header. Moreover, according to the IEEE1394 standard, the header has to contain the transaction code, and this transaction code defines the type of main packet.

Also, in the IEEE1394 standard, as derivatives of the packet shown in FIG. 3, there are an isochronous packet and an asynchronous packet. These isochronous packet and asynchronous packet are distinguished from each other by the transaction code.

Figure 4:
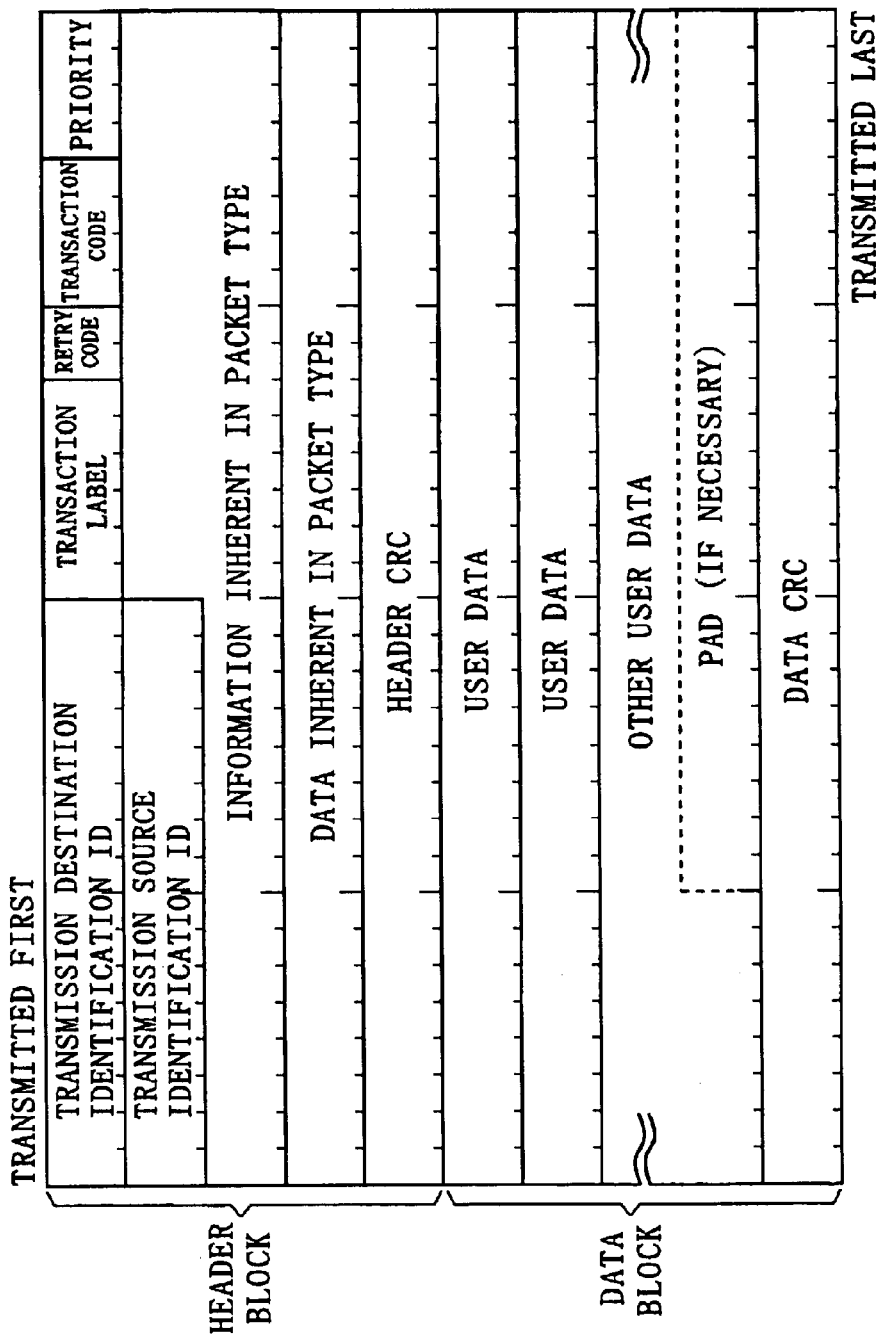
FIG. 4 is a diagram showing a data format of IEEE1394 standard asynchronous packet.

FIG. 4 shows a data format of an asynchronous packet. As shown in FIG. 4, in this asynchronous packet, a header comprises a transmission destination node identification data (destination_ID), a transaction label (tl), a retry code (rt), transaction code (tcode), priority information (pri), transmission source node identification data (source_ID), information inherent in packet type (destination_offset, rcode, reserved), data inherent in packet type (quadlet_data, data_length, extended_tcode) and a header CRC.

Figure 5:
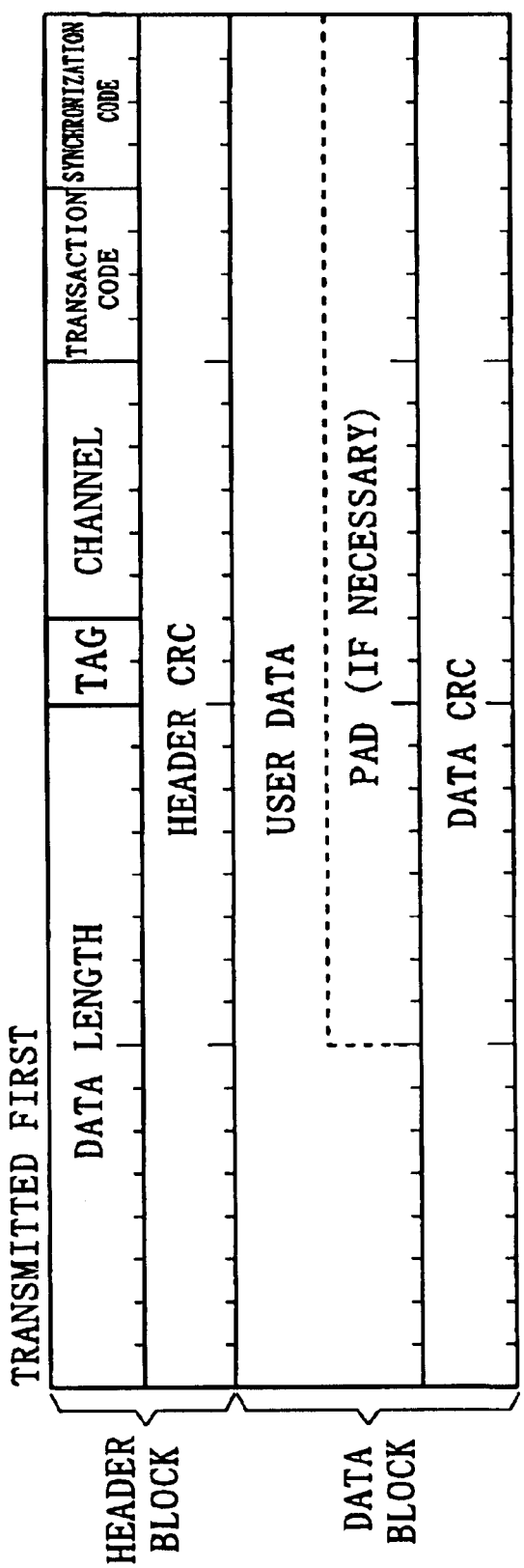
FIG. 5 is a diagram showing a data format of an IEEE1394 standard isochronous packet.

FIG. 5 shows a data format of an isochronous packet. As shown in FIG. 5, in this isochronous packet, a header comprises a data length (data_length), an isochronous data format tag (tag), an isochronous channel (channel), a transaction code (tcode), a synchronizing code (sy) and a header CRC.

Figure 2:
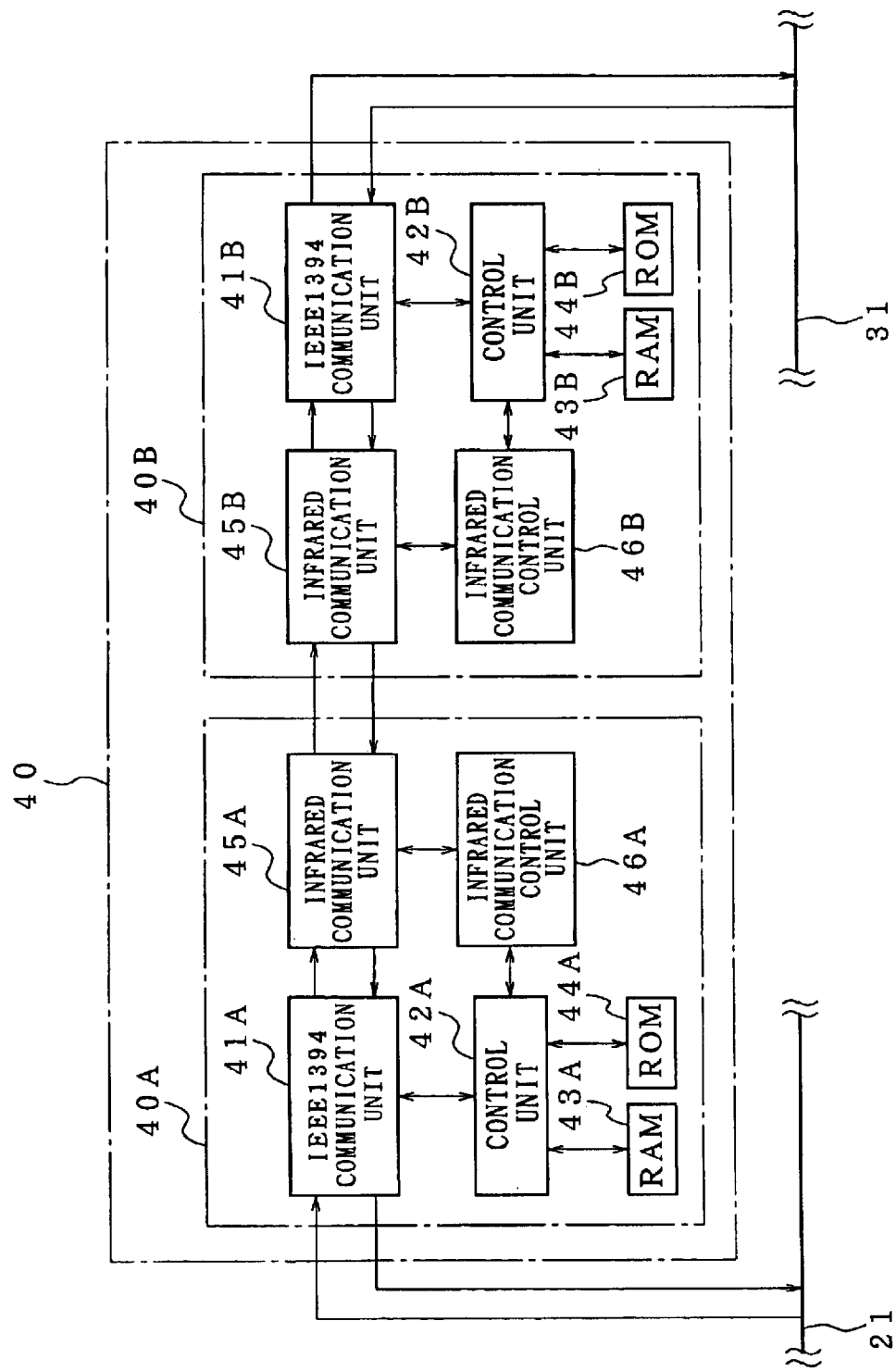
FIG. 2 is a block diagram showing an IEEE1394 for connecting two IEEE1394 buses within the radio transmission system.

Referring back to FIG. 1, the WN nodes 2, 3 constitute a bridge 40 which connect IEEE1394 buses 21, 31. FIG. 2 shows the bridge 40 in detail. As shown in FIG. 2, the above-mentioned WN nodes 2, 3 comprise two portals 40A, 40B as first and second communication means. The portals 40A, 40B are IEEE1394 nodes, respectively.

As shown in FIG. 2, the portal 40A comprises a communication unit 41A, a control unit 42A, a RAM (random-access memory) 43A, a ROM (read-only memory) 44A, an infrared communication unit 45A and an infrared communication control unit 46A. Similarly, the portal 40B comprises an IEEE1394 communication unit 41B, a control unit 42B, a RAM 43B, a ROM 44B, an infrared communication unit 45B and an infrared communication control unit 46B.

The RAMs 43A, 43B function as CSRs (control and status registers) in which register areas such as bandwidth available register used in the IEEE1394 bridge and areas for register groups defined by the IEEE1394-1995 (IEEE1394) are maintained. The remaining amount of the available bandwidth that can be used in the isochronous communication within the bridge 40 is written in the bandwidth available register. Similarly, the ROMs 44A, 44B also conform to the format of the IEEE1394 bridge and the IEEE1394-1995, includes a configuration ROM, and stores various kinds of programs, various kinds of parameters, etc. Further, the ROMs 44A, 44B store the available bandwidth that can be used in the isochronous communication by the infrared communication units 45A, 45B as the initial value BWR of the remaining amount of the available bandwidth which can be used in the isochronous communication within the above-mentioned bridge 40.

As shown in FIG. 2, the IEEE1394 communication units 41A, 41B are respectively controlled by the control units 42A, 42B and are operated as follows. That is, the IEEE1394 communication units 41A, 41B assemble data supplied from the control units 42A, 42B into packets, and send these packets through the buses 21, 31 or the infrared communication units 45A, 45B, respectively. The IEEE1394 communication units 41A, 41B output the packets received from the buses 21, 31 to the infrared communication units 45A, 45B or extract data from these packets, and output the data thus extracted to the control units 42A, 42B, respectively. Also, the IEEE1394 communication units 41A, 41B output the packets received from the infrared communication units 45A, 45B to the buses 21, 31 or extract data from these packets, and output the data thus extracted to the control units 42A, 42B, respectively.

The infrared communication units 45A, 45B play a role of fabric of the IEEE1394. The infrared communication units 45A, 45B are controlled by the infrared communication control units 46A, 46B, and transmit and receive packets between the portals 40A and 40B by infrared rays, respectively. The infrared communication control units 46A, 46B are operated under control of the above-mentioned control units 42A, 42B.

A method of calculating the initial value BWR of the remaining amount of the available bandwidth stored in the ROMs 44A, 44B and which can be used within the bridge 40 will be described next.

According to the IEEE1394, a duration of 125 $\mu$s is defined as one cycle. Of the duration of 125 $\mu$s, it is assured that a duration of at least 25 $\mu$s can be used by the asynchronous communication. Accordingly, only a duration of 100 $\mu$s can be allocated to the isochronous communication at maximum. In the IEEE1394, since the bandwidth of 125 $\mu$s is expressed as 6144 [bandwidth allocation units], the bandwidth that can be used by the isochronous communication becomes 4915 [bandwidth allocation units]. Heretofore, this value is used as an initial value.

An example of a manner in which the initial value BWR used when the data transfer rate of the portals 40A, 40B is 100 Mbps and the data transfer rate of communication between the infrared communication units 45A and 45B is 40 Mbps is calculated will be described below.

Assuming that B1 and B2 are maximum available bandwidths that can be used for the isochronous communication within 125 $\mu$s is by the IEEE1394 communication equipment which may effect the communication at the data transfer rates of 100 Mbps and 40 Mbps, then the maximum available bandwidths B1 and B2 may be expressed as below.

$B1$=100 [$M$ bits/s]*100 [$\mu$s]=100 [$K$ bits]

$B2$=40 [$M$ bits/s]*100 [$\mu$s]=40 [$K$ bits]

Accordingly, the initial value BWR that is stored in the ROMs 44A, 44B is calculated as B2/B1 times the conventional initial value as shown in the following equation (1):

$$BWR=B2/B1*4915=1966 \quad (1)$$

The initial value BWR may be obtained by the following equation (2) instead of the above-mentioned equation (1):

$$BWR=6144*(100\ \mu s/125\ \mu s)*(40\ \text{Mbps}/100\ \text{Mbps}) \approx 1966 \quad (2)$$

The initial value BWR is calculated as described above, and this initial value BWR is written in the bandwidth available registers of the RAMs 43A, 43B of the portals 40A, 40B when the bridge 40 is initialized as will be described later on. Thus, even when the data transfer rate between the infrared communication units 45A and 45B is 40 Mbps, it becomes possible to operate the bridge 40 as the IEEE1394 communication equipment having the available bandwidth of 100 Mbps apparently.

An example of a manner in which the initial value BWR used when the data transfer rate of the portals 40A, 40B is 200 Mbps and the data transfer rate of communication between the infrared communication units 45A and 45B is 140 Mbps is calculated will be described below.

Assuming that B1 and B2 are maximum available bandwidths that can be used for the isochronous communication within 125 $\mu$s by the IEEE1394 communication equipment which may effect the communication at the data transfer rates of 200 Mbps and 140 Mbps, then the maximum available bandwidths B1 and B2 may be expressed as below.

$B1$=200 [$M$ bits/s]*100 [$\mu$s]=200 [$K$ bits]

$B2$=140 [$M$ bits/s]*100 [$\mu$s]=140 [$K$ bits]

Accordingly, the initial value BWR that is stored in the ROMs 44A, 44B is calculated as B2/B1 times the conventional initial value as shown in the following equation (3):

$$BWR=B2/B1*4915 \approx 3440 \quad (3)$$

The initial value BWR may be obtained by the following equation (4) instead of the above-mentioned equation (3):

$$BWR=6144*(100\ \mu s/125\ \mu s)*(140\ \text{Mbps}/200\ \text{Mbps}) \approx 3440 \quad (4)$$

The initial value BWR is calculated as described above and this initial value BWR is written in the bandwidth available registers of the RAMs 43A, 43B of the portals 40A, 40B when the bridge 40 is initialized as will be described later on. Thus, even when the data transfer rate between the infrared communication units 45A and 45B is 140 Mbps, it becomes possible to operate the bridge 40 as the IEEE1394 communication equipment having the available bandwidth of 200 Mbps apparently.

The manner in which the available bandwidth obtained when the bridge 40 shown in FIG. 2 is initialized will be described next.

The bridge 40 is initialized when the bus reset of the IEEE1394 bus 21 is detected or the bus reset of the IEEE1394 bus 31 is detected or the net configuration is detected. Then, when the bridge 40 is initialized, the available bandwidth is initialized.

When the bus reset occurs in the IEEE1394 bus 21, the occurrence of the bus reset is detected by the control unit 42A of the portal 40A. Then, when the bridge 40 is initialized, the processing of the flowchart shown in FIG. 6 is executed.

Figure 6:
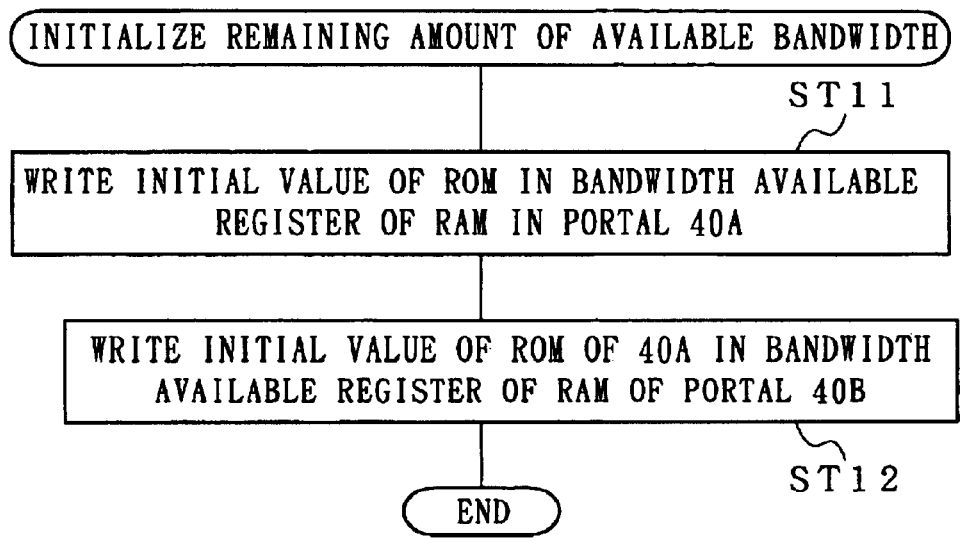
FIG. 6 is a flowchart to which reference will be made in explaining an example of how to initialize a remaining amount of an available bandwidth of an IEEE1394 bridge.

Referring to FIG. 6, initially, at a step ST11, in the portal 40A, the initial value BWR stored in the ROM 44A is written in the bandwidth available register of the RAM 43A. In the next step ST12, the initial value BWR stored in the ROM 44A of the portal 40A is written in the bandwidth available register of the RAM 43B of the portal 40B, and then control is ended.

When the bus reset occurs in the IEEE1394 bus 31, the occurrence of the bus reset is detected by the control unit 42B of the portal 40B. In the same manner effected when the bus reset occurs in the IEEE1394 bus 21, the initial value BWR stored in the ROM 44B of the portal 40B is written in the bandwidth available registers of the RAMs 43A, 43B.

As described above, in the first embodiment, when the bridge 40 is initialized, the available bandwidths that may be used by the infrared communication units 45A, 45B for the isochronous communication are written in the bandwidth available registers of the RAMs 43A, 43B of the portals 40A, 40B as the initial value BWR of the available bandwidth that can be used within the bridge 40 for the isochronous communication.

Therefore, according to the first embodiment, it is possible to increase the available bandwidth of the bridge 40 apparently. Thus, even when the data transfer rate between the infrared communication units 45A and 45B, for example, is 40 Mbps, it becomes possible to operate the bridge 40 as the IEEE1394 having the available bandwidth of 100 Mbps apparently. In this case, as described above, even when the initial value BWR is not set to the value equal to the available bandwidth that may be used by the infrared communication units 45A, 45B for the isochronous communication but is set to the value smaller than the above-mentioned available bandwidth, there may be obtained similar action and effects. However, the available bandwidth that can be used in actual practice is decreased.

Even when the data transfer rate between the infrared communication units 45A and 45B, for example, is 140 Mbps, it becomes possible to operate the bridge 40 as the IEEE1394 communication equipment whose available bandwidth is 200 Mbps apparently. Therefore, it is possible to prevent the available bandwidth of 40 Mbps from becoming useless.

Figure 7:
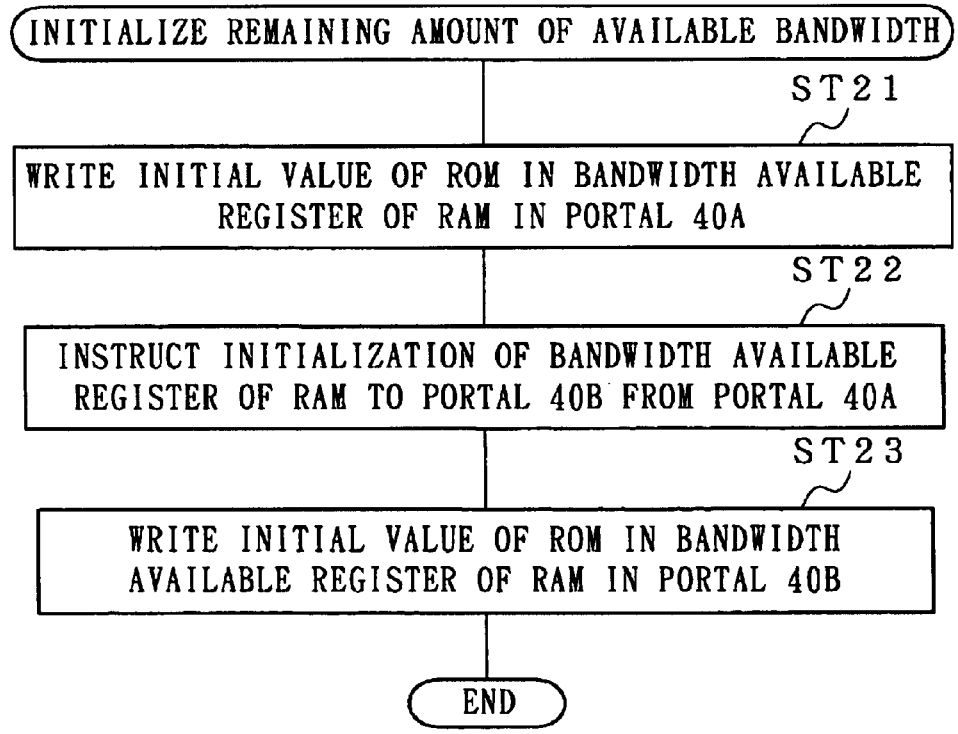
FIG. 7 is a flowchart to which reference will be made in explaining another example of how to initialize a remaining amount of an available bandwidth of an IEEE1394 bridge.

If the available bandwidth is initialized when the bus reset of the IEEE1394 bus 21 is detected by the control unit 42A of the portal 40A, instead of executing the processing of the flowchart shown in FIG. 6, steps of a flowchart shown in FIG. 7 may be executed.

Referring to FIG. 7, initially, at a step ST21, the initial value BWR stored in the ROM 44A is written in the bandwidth available register of the RAM 43A. In the next step ST22, the initialization of the bandwidth available register of the RAM 43B is instructed to the portal 40B from the portal 40A. At the next step ST23, in the portal 40B, the initial value BWR stored in the ROM 44B is written in the bandwidth available register of the RAM 43B, and then control is ended.

In this case, although a flowchart is not shown, when the bus reset of the IEEE1394 bus is detected by the control unit 42B of the portal 40B, the similar processing is executed except that a relationship between the portals 40A and 40B is reversed.

While the RAMs 43A, 43B of the portals 40A, 40B include the bandwidth available registers which set the available bandwidth and the initial value BWR is stored in the ROMs 44A, 44B of the portals 40A, 40B as described above in the first embodiment, the present invention is not limited thereto, and the following variant ① or ② is also possible. That is, the case ① is the case in which the RAM 43A of only the portal 40A includes the bandwidth available register and the initial value BWR is stored in the ROM 44A. The case ② is the case in which the RAM 43B of only the portal 40B includes the bandwidth available register and the initial value BWR is stored in the ROM 44B.

Figure 8:
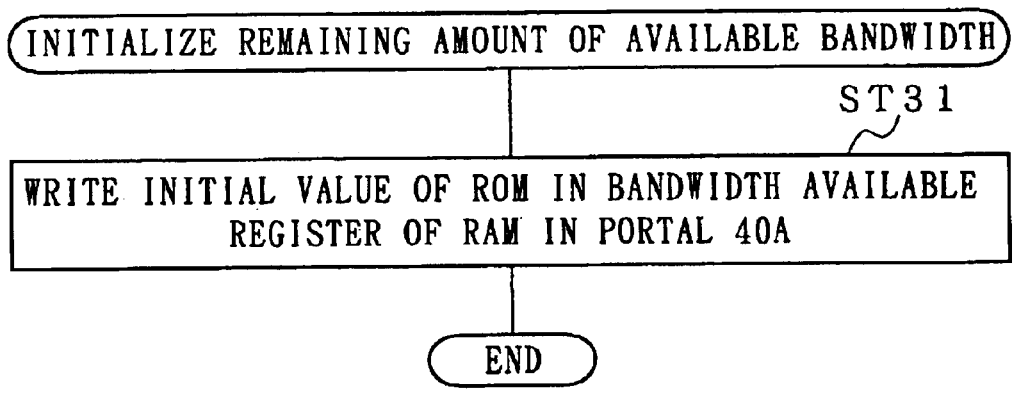
FIG. 8 is a flowchart to which reference will be made in explaining still another example of how to initialize a remaining amount of an available bandwidth of an IEEE1394 bridge.

In the case ① and if the bus reset of the IEEE1394 bus 21 is detected by the control unit 42A of the portal 40A, then when the available bandwidth is initialized, the processing of a flowchart shown in FIG. 8 may be effected.

Referring to FIG. 8, at a step ST31, in the portal 40A, the initial value BWR stored in the ROM 44A is written in the bandwidth available register of the RAM 43A, and then control is ended.

Figure 9:
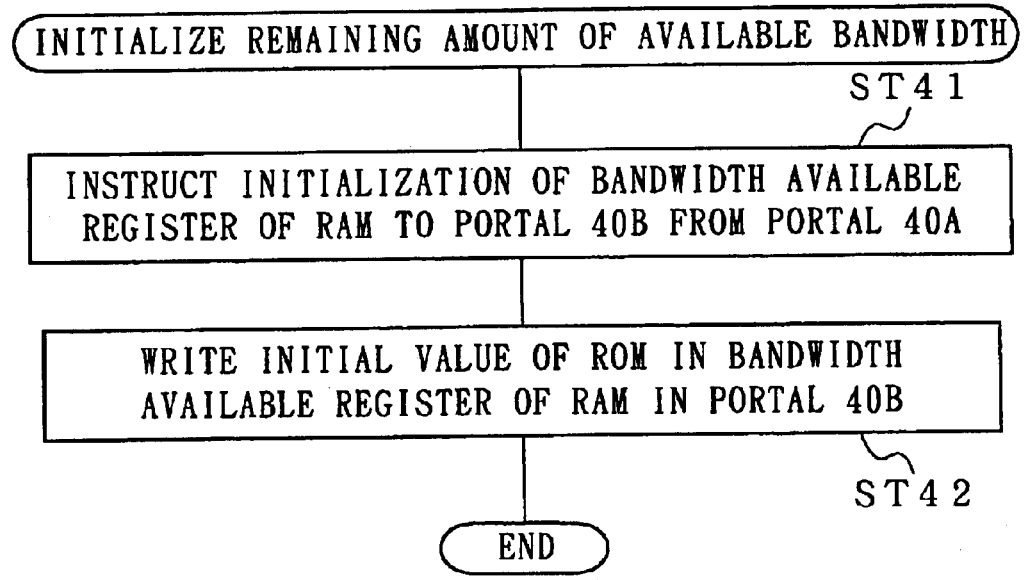
FIG. 9 is a flowchart to which reference will be made in explaining a further example of how to initialize a remaining amount of an available bandwidth of an IEEE1394 bridge.

On the other hand, in the case ② and if the bus reset of the IEEE1394 is detected by the control unit 42A of the portal 40A, then when the available bandwidth is initialized, the processing of a flowchart shown in FIG. 9 may be executed.

Referring to FIG. 9, initially, at a step ST41, the initialization of the bandwidth available register of the RAM 43B is instructed to the portal 40B from the portal 40A. At the next step ST42, in the portal 40B, the initial value BWR stored in the ROM 44B is written in the bandwidth available register of the RAM 43B, and then control is ended.

Although not shown, in the case of the above-mentioned cases ①, ② and if the bus reset of the IEEE1394 bus 31 is detected by the control unit 42B of the portal 40B, then the similar processing will be executed (see FIGS. 8 and 9) except that the relationship between the portals 40A and 40B is reversed.

Figure 10:
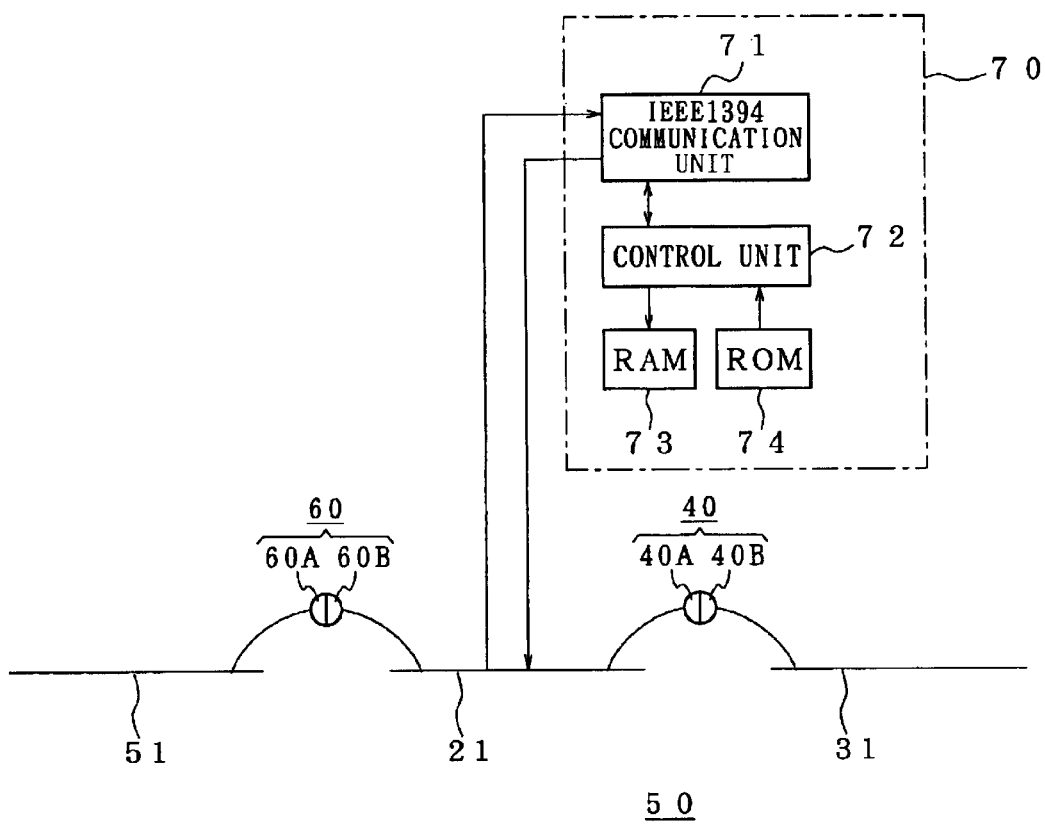
FIG. 10 is a block diagram showing a transmission system according to a second embodiment of the present invention.

A second embodiment according to the present invention will be described next. FIG. 10 shows in block form a transmission system 50 according to the second embodiment of the present invention. In FIG. 10, elements and parts identical to those of FIG. 2 are marked with the same reference numerals, and therefore need not be described in detail.

As shown in FIG. 10, in this transmission system 50, in addition to the bridge 40, there is provided a bridge 60 which is arranged in the manner similar to the manner in which this bridge 40 is arranged. One portal 60B comprising this bridge 60 is connected to an IEEE1394 bus 21, and the other portal 60A is connected to an IEEE1394 bus 51.

Also, an IRM (isochronous resource manager) 70 is connected to the IEEE1394 21. The IRM is the isochronous communication management node for managing the communication resource. To effect the isochronous communication, the bus needs the IRM in addition to the owner, the talker and the listener, although not shown. This IRM is automatically selected upon bus configuration.

As shown in FIG. 10, the IRM 70 comprises an IEEE1394 communication unit 71, a control unit 72, a RAM 73 and a ROM 74. The IEEE1394 communication unit 71 is controlled by the control unit 72, assembles data supplied from the control unit 72, transmits this IEEE1394 packet through the bus 21, extracts data from the packet received from the bus 21, and then outputs the packet thus extracted to the control unit 72. The ROM 74 includes a configuration ROM, and this ROM 74 stores various kinds of programs, various kinds of parameters, etc.

Further, the ROM 74 stores the bandwidth that can be used by the infrared communication units (see FIG. 2) of the respective bridges 40, 60 as the initial value BWR of the remaining amount of the available bandwidth that can be used within the above-mentioned IEEE1394 bus 21 for the isochronous communication. The calculation method of the initial value BWR is similar to the calculation method of the initial value BWR of the remaining amount of the available bandwidth stored in the above-mentioned ROMs 44A, 44B and which can be used within the bridge 40 for the isochronous communication. For example, when the data transfer rate of the bus 21 is 100 Mbps and the data transfer rates of the infrared communication units of the bridges 40, 60 are 40 Mbps, the initial value BWR is calculated as BWR=1966 (see the equation (1)).

The RAM 73 functions as the CSR of the IEEE1394, and properly stores data, program, etc. necessary for the control unit 72 to execute various kinds of processing. The CSR of the RAM 73 includes the area of the bandwidth available register and the area of the channel available register. As will be described later on, when the bus 21 is initialized, if the initial value BWR stored in the ROM 74 is written in the bandwidth available register of the RAM 73, then even though the data transfer rates of the infrared communication units of the bridges 40, 60 are 40 Mbps, it becomes possible to apparently operate the section of the bus 21 and the bridges 40, 60 as the IEEE1394 communication equipment whose available bandwidth is 100 Mbps.

In the transmission system 50 shown in FIG. 10, it is sufficient that the bridges 40, 60 may not have the function to initialize the available bandwidth unlike the bridge 40 shown in FIG. 2.

In the transmission system 50 shown in FIG. 10, the manner in which the available bandwidth is initialized when the IEEE1394 bus 21 is initialized will be described next.

Figure 11:
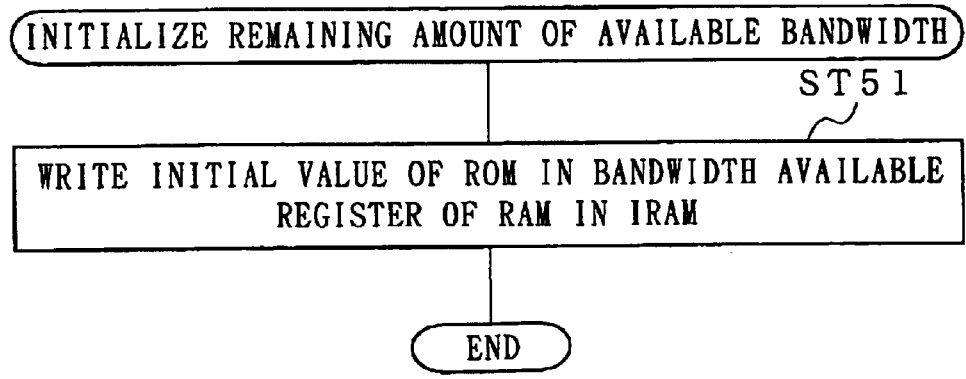
FIG. 11 is a flowchart to which reference will be made in explaining how to initialize a remaining amount of an available bandwidth of an IEEE1394 bus.

The IEEE1394 bus 21 is initialized by a net configuration or a bus reset and the like. That is, the control unit 72 in the IRM 70 executes a step of a flowchart shown in FIG. 11. Referring to FIG. 11, at a step ST51, the initial value BWR stored in the ROM 74 is written in the bandwidth available register of the RAM 73, and then control is ended.

As described above, in the second embodiment, when the IEEE1394 bus 21 is initialized, the available bandwidth that may be used by the infrared communication units of the bridges 40, 60 for the isochronous communication are written in the bandwidth available register of the RAM 73 in the IRM 70 as the initial value BWR of the remaining amount of the available bandwidth that can be used within the bus 21 for the isochronous communication.

Therefore, according to the second embodiment, it is possible to increase the apparent available bandwidths of the sections of the bus 21 and the bridges 40, 60. Thus, even when the data transfer rates of the infrared communication units of the bridges 40, 60, for example, are 40 Mbps, it becomes possible to apparently operate the sections of the bus 21 and the bridges 40, 60 as the IEEE1394 communication equipment whose available bandwidth is 100 Mbps. Moreover, even when the data transfer rates of the infrared communication units of the bridges 40, 60, for example, are 140 Mbps, it becomes possible to apparently operate the sections of the bus 21 and the bridges 40, 60 as the IEEE1394 communication equipment whose available bandwidth is 200 Mbps. As a consequence, it is possible to prevent the available bandwidth of 40 Mbps from becoming useless.

A third embodiment according to the present invention will be described next. FIG. 12 shows in block form a transmission system 80 according to the third embodiment. In FIG. 12, elements and parts identical to those of FIG. 2 are marked with the same references and therefore need not be described in detail.

As shown in FIG. 12, in this transmission system 80, the bridge 40 comprises the portals 40A and 40B which are directly connected together. Then, the IEEE1394 communication unit 41B of the portal 40B is connected to the infrared communication unit 45A instead of the IEEE1394 bus 31. That is, in this case, the infrared communication unit functions not as the fabric between the portals but as an IEEE1394 bus 81.

The communication destination of the bus includes the bridge 60 which is arranged in the same way as this bridge 40 is arranged. One portal comprising this bridge 60 communicates with the infrared communication unit 45A of the portal 40B, and effects the infrared communication for arranging the IEEE1394 bus. Then, an IEEE1394 communication unit 61A of the other portal 60A is connected to the IEEE1394 bus 31.

The infrared communication units 45A, 45B play the role of the IEEE1394 bus. The infrared communication units 45A, 45B are respectively controlled by infrared communication control units 46A, 46B, and transmit and receive a packet between the portals 40B and 60B by using an infrared signal.

Further, the portal 40B functions as an IRM of an IEEE1394 bus 81. The IRM is the isochronous communication management node for managing the communication resource. To effect the isochronous communication, the bus needs the IRM in addition to the owner, the talker and the listener, although not shown. This IRM is automatically selected upon bus configuration.

The ROM 44B stores the available bandwidth that can be used by the IEEE1394 bus comprising the infrared communication units 45A, 45B for the isochronous communication as the initial value BWR that can be used in the isochronous communication. The calculation method of the initial value BWR of the remaining amount is similar to the calculation method of the initial value BWR of the remaining amount of the available bandwidth stored in the above-mentioned ROMs 44A, 44B of the bridge 40 shown in FIG. 2 and which can be used within the bridge 40 for the isochronous communication. For example, when the data transfer rate of the bus 21 is 100 Mbps and the data transfer rates of the infrared communication unit of the bus 81 is 40 Mbps, the initial value BWR is calculated as BWR=1966 (see the equation (1)).

The CSR of the RAM 43B includes the area of the bandwidth available register and the area of the channel available register. The bandwidth available register is the area in which the available bandwidth that may be used in the isochronous communication is stored. As will be described later on, when the bus 81 is initialized, if the initial value BWR stored in the ROM 44B is written in the bandwidth available register of the RAM 43B, then even though the data transfer rate of the infrared communication unit of the bus 81 is 40 Mbps, it becomes possible to apparently operate the bus 81 as the IEEE1394 communication equipment whose available bandwidth is 100 Mbps.

In the transmission system 80 shown in FIG. 12, it is sufficient that the bridges 40, 60 may not have the function to initialize the available bandwidth unlike the bridge 40 shown in FIG. 2.

In the transmission system 80 shown in FIG. 12, the manner in which the remaining amount of the available bandwidth is initialized when the IEEE1394 bus 81 is initialized will be described next.

Figure 13:
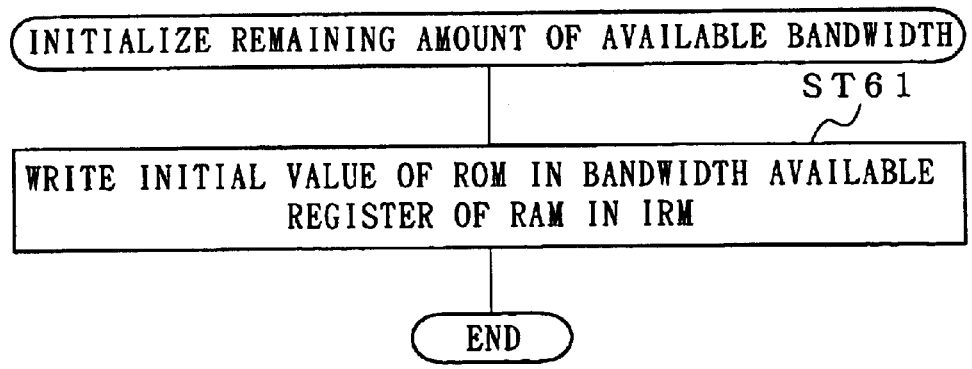
FIG. 13 is a flowchart to which reference will be made in explaining how to initialize a remaining amount of an available bandwidth of an IEEE1394 bus.

The IEEE1394 bus 81 is initialized by a net configuration or a bus reset and the like. That is, the control unit 42B of the portal 40B which functions as the IRM executes a step of a flowchart shown in FIG. 13. Referring to FIG. 13, at a step ST61, the initial value BWR stored in the ROM 44B is written in the bandwidth available register of the RAM 43B, and then control is ended.

While the portal which functions as the IRM is the portal 40B in the transmission system 80 shown in FIG. 12, the present invention is not limited thereto, and the portal 60B may function as the IRM.

As described above, in the third embodiment, when the IEEE1394 bus 81 is initialized, the available bandwidth that may be used within the bus 81 for the isochronous communication is written in the bandwidth available register of the RAM 43B of the portal 40B which functions as the IRM 70 as the initial value BWR of the available bandwidth that can be used for the isochronous communication. Therefore, according to the third embodiment, it is possible to increase the apparent available bandwidth of the section of the bus 81. Thus, even when the data transfer rate of the infrared communication unit of the bus 81, for example, is 40 Mbps, it becomes possible to apparently operate the section of the bus 81 as the IEEE1394 communication equipment whose available bandwidth is 100 Mbps. Moreover, even when the data transfer rate of the infrared communication unit of the bus 81, for example, is 140 Mbps, it becomes possible to apparently operate the section of the bus 81 as the IEEE1394 communication equipment whose available bandwidth is 200 Mbps. As a consequence, it is possible to prevent the available bandwidth of 40 Mbps from becoming useless.

While the portals of the bridges 40, 60 and the IEEE1394 bus 81 communicate with each other via infrared rays as described above, the present invention is not limited thereto, and may be similarly applied to data transmission apparatus using radio waves as a radio communication medium.

According to the present invention, there is provided the data transmission apparatus which is comprised of the first transmission unit having the first available bandwidth and the second transmission unit connected to the first transmission unit and which has the second available bandwidth smaller than the first available bandwidth. When the first transmission unit is initialized, the remaining amount of the first available bandwidth is set to the value equal to or smaller than the second available bandwidth. Thus, it becomes possible to increase the whole available bandwidth apparently. Therefore, it becomes possible to operate the communication equipment whose available bandwidth is less than 100 Mbps as the IEEE1394 communication equipment. For example, communication equipment having a data transfer rate of 40 Mbps, for example, may be apparently operated as IEEE1394 communication equipment having an available bandwidth of 100 Mbps. Moreover, communication equipment having a data transfer rate of 140 Mbps, for example, may be apparently operated as IEEE1394 communication equipment having an available bandwidth of 200 Mbps. As a result, it becomes possible to remove a useless available bandwidth of 40 Mbps.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as claimed in the appended claims.

What is claimed is:

1. A data transmission apparatus comprising:

a first transmission unit having a first available bandwidth; and a second transmission unit connected to said first transmission unit and having a second available bandwidth smaller than said first available bandwidth, wherein said first transmission unit includes remaining amount setting means for setting a remaining amount of said first available bandwidth and said remaining amount setting means sets said remaining amount of said first available bandwidth to an amount equal to or smaller than said second available bandwidth when said first transmission unit is initialized, wherein said first transmission unit includes a first portal having a bridge for connecting two buses, and said second transmission unit includes a radio transmission line interposed between second and third portals forming said bridge.

2. The data transmission apparatus as claimed in claim 1, wherein said first available bandwidth is used in an isochronous communication at said first transmission unit.

3. A data transmission apparatus comprising:

a first transmission unit having a first available bandwidth; and a second transmission unit connected to said first transmission unit and having a second available bandwidth smaller than said first available bandwidth, wherein said first transmission unit includes remaining amount setting means for setting a remaining amount of said first available bandwidth and said remaining amount setting means sets said remaining amount of said first available bandwidth to an amount equal to or smaller than said second available bandwidth when said first transmission unit is initialized, wherein said first transmission unit comprises a first portal having first and second bridges respectively connected to first and second buses and said second transmission unit comprises a radio transmission line interposed between second and third portals respectively comprising said first and second bridges to form a third bus.

* * * * *